United States Patent [19]

Schoch

[11] Patent Number: 4,552,251
[45] Date of Patent: Nov. 12, 1985

[54] CYCLE WHEEL RIM BRAKE CONSTRUCTION

[75] Inventor: Robert Schoch, Hilzingen, Fed. Rep. of Germany

[73] Assignee: Weinmann AG, Hohentwiel, Fed. Rep. of Germany

[21] Appl. No.: 495,337

[22] PCT Filed: Oct. 12, 1982

[86] PCT No.: PCT/EP82/00226
 § 371 Date: Apr. 29, 1983
 § 102(e) Date: Apr. 29, 1983

[87] PCT Pub. No.: WO83/01423
 PCT Pub. Date: Apr. 28, 1983

[30] Foreign Application Priority Data
 Oct. 15, 1981 [DE] Fed. Rep. of Germany ....... 3141004

[51] Int. Cl.$^4$ ............................................... B62L 1/12
[52] U.S. Cl. .............................. 188/24.21; 188/24.22
[58] Field of Search .............. 188/24.12, 24.13, 24.14, 188/24.15, 24.16, 24.17, 24.18, 24.19, 24.20, 24.21; 74/526

[56] References Cited
 FOREIGN PATENT DOCUMENTS
 0023414  2/1981  European Pat. Off. .
 2639008  3/1977  Fed. Rep. of Germany .
 0907896  3/1946  France .
 0950639 10/1949  France .
 0976210  3/1951  France .
 0275676  8/1951  Switzerland ................. 188/24.12
 2093937  6/1982  United Kingdom ......... 188/24.12

OTHER PUBLICATIONS
LeCycle, vol. 17, No. 29, Oct. 1962 (Paris, FR) p. 21.

Primary Examiner—Duane A. Reger
Assistant Examiner—Alvin Oberley
Attorney, Agent, or Firm—Learman & McCulloch

[57] ABSTRACT

A rim brake with central traction (1) contains two two-armed brake levers (2, 3) which are pivotably mounted on a mounting plate (4), are held under spring tension and have actuating arms (2b, 3b) which cross over each other, and also contains a central traction cable (5) which can be adjusted in its effective traction length, a cable carrier (7) provided with a clamping screw (6) to clamp the traction cable on the cable carrier, and a connection between the cable carrier (7) and the free ends (2b', 3b') of the brake lever actuating arms. In order above all to achieve particularly simple and rapid adjustment of the traction cable (5) relative to the cable carrier (7), the connection between this cable carrier (7) and the free ends (10a, 11a) of the brake lever actuating arms (2b, 3b) is formed by two pull rods (10, 11) of equal length which on the one hand are connected pivotably to the cable carrier (7) and on the other hand are connected to the free ends of the brake lever actuating arms and have a stop surface (13, 14) which rests on an associated matching surface (15, 16) on the cable carrier (7) when the brake (1) is open.

9 Claims, 3 Drawing Figures

CYCLE WHEEL RIM BRAKE CONSTRUCTION

The invention relates to a cycle wheel rim brake with central traction, containing two two-armed brake levers which are pivotably mounted on a mounting plate, are held under spring tension and have actuating arms which cross over each other, and also containing a central traction cable, a cable carrier provided with a clamping screw to clamp the traction cable onto the cable carrier at an adjustable effective traction length, further containing a connection between the cable carrier and the free ends of the brake lever actuating arms.

In a known construction of a rim brake with central traction for a bicycle (German Offenlegungsschrift No. 26 39 008) the lower end of the traction cable is fixed on the free end of one brake lever actuating arm at an adjustable effective traction length. One end of a rigid traction member is articulated on the free end of the other brake lever actuating arm, the other end of the traction member being constructed as a gripping device to enclose the traction cable. The end of the traction member connected to the free end of one brake lever actuating arm is constructed with a longitudinal slot and has a cam plate with means for adjusting the brake lever arms bearing the brake shoes relative to the rim of a bicycle wheel. Apart from this costly construction for connecting the traction cable to both brake lever actuating arms this known rim brake also has the disadvantage that it always has a tendency to pull asymmetrically.

In a rim brake with central traction of the type described in the introduction which is known in the art the lower end of the central traction cable is clamped on the cable carrier with the aid of the clamping screw so that its effective traction length is adjustable. The lower part of the cable carrier is constructed in the form of a hook on which a short connecting cable which connects the free ends of the two brake lever actuating arms is loosely suspended. Here, however, mounting proves awkward in so far as the cable carrier has to be gripped with one hand whilst loosening or tightening the clamping screw if the effective traction cable length is to be adjusted.

The object of the invention, therefore, is to improve a rim brake with central traction of the type described in the introduction in such a way as to simplify mounting and especially to simplify adjustment of the traction cable on the cable carrier.

This object is achieved according to the invention in that the connection between the cable carrier and the free ends of the brake lever actuating arms is formed by two pull rods of equal length which are pivotably connected at corresponding ends to the cable carrier and at their opposite ends to the free ends of the brake lever actuating arms and have a stop surface which comes to rest on a matching surface on the cable carrier when the brake is released.

In the rim brake with central traction according to the invention the connection between the free ends of the brake lever actuating arms is formed by the two pull rods and this results on the one hand in a comparatively rigid and particularly stable connection which nevertheless provides the freedom of movement which is necessary for a rim brake with central traction in order to pull the two brake actuating arms; on the other hand the construction, arrangement and connection of these two pull rods with the cable carrier provides a rotationally fixed retaining means for the cable carrier so that the clamping screws on the cable carrier can be easily loosened and tightened and at the same time the traction cable can be adjusted and mounted in the desired manner with one hand.

Further details of the invention are set out in the subordinate claims and in the following description of an embodiment which is illustrated in the drawings, in which:

Figure 1:
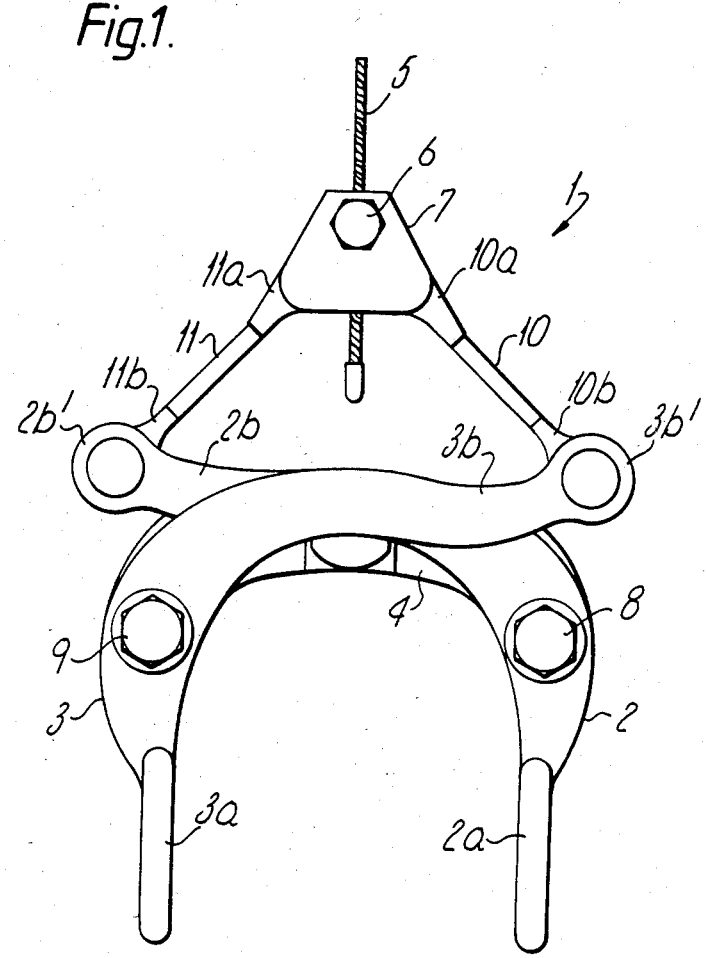
FIG. 1 shows a front view of the rim brake with central traction according to the invention.

The rim brake with central traction 1 which is illustrated in the drawings contains as essential parts the two-armed brake levers 2 and 3 of conventional construction which are pivotably mounted on a mounting plate 4 adapted to be mounted on the cycle frame and are held under spring tension by springs which are not shown, also containing a central traction cable 5 the lower end of which—shown here—can be clamped on a unitary plate-like cable carrier 7 with the aid of a clamping screw 6 so that its effective traction length can be adjusted, and also containing a connection which will be explained in greater detail below between the cable carrier and the brake levers 2, 3.

Corresponding arms 2a and 3a of the brake levers 2, 3 are spaced apart so as to straddle a wheel rim and have brake blocks (not shown) arranged thereon in the usual way whilst their upper ends are constructed as actuating arms 2b and 3b respectively which cross over one another and terminate on opposite sides of a vertical plane 17 passing between the arms 2a and 3a. The connection between the brake levers 2, 3 and the corresponding ends of the mounting plate 4 is formed by conventional screws 8 and 9 respectively which at the same time form the hinge axes for the pivotable mounting of the brake levers.

It is of particular importance that the free ends 2b' and 3b' of the two brake lever actuating arms 2b and 3b respectively are connected to the cable carrier 7 by two pull rods 10, 11 of equal length. This construction is such that the pull rods 10, 11 are pivotably connected to the cable carrier 7 and the free ends 2b' and 3b' of the brake lever actuating arms 2b and 3b. For this purpose the two ends 10a, 10b and 11a, 11b respectively of each pull rod 10, 11 are constructed as bearing ends widened like eyelets with a hole 10a', 10b' or 11a', 11b' through which pass the associated pivot pins 12 which are constructed and mounted in the usual way like rivets.

On the outer periphery of the bearing end 10a or 11a respectively of each pull rod 10, 11 a stop surface 13 or 14 respectively is formed which extends in a straight line or tangentially and comes to rest on a matching surface on the cable carrier when the brake is opened.

Figure 2:
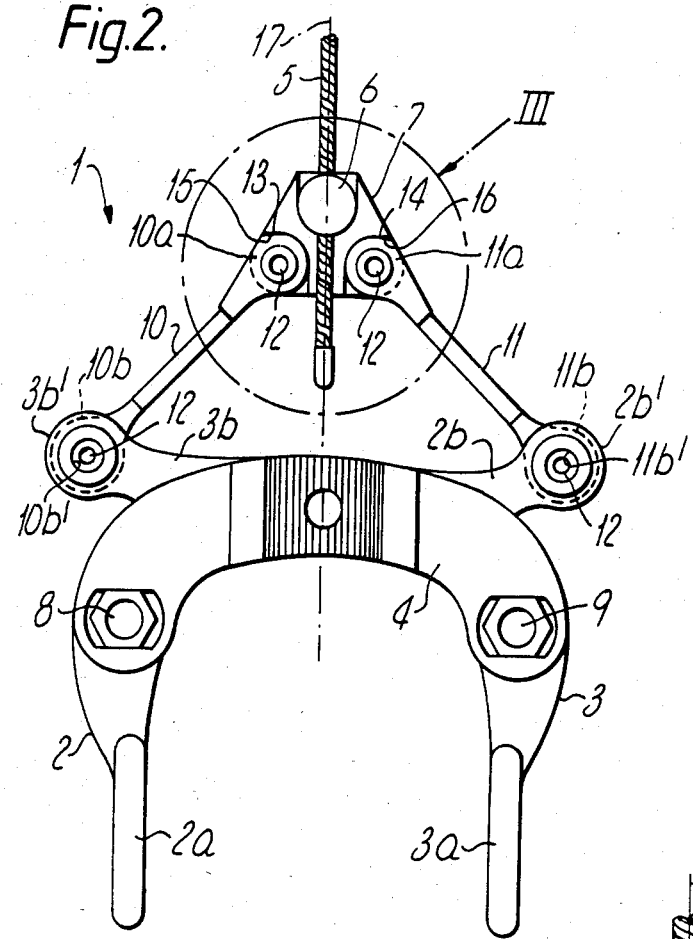
FIG. 2 shows a rear view of the rim brake with central traction according to FIG. 1 in which the rim brake is in the open position.
Figure 3:
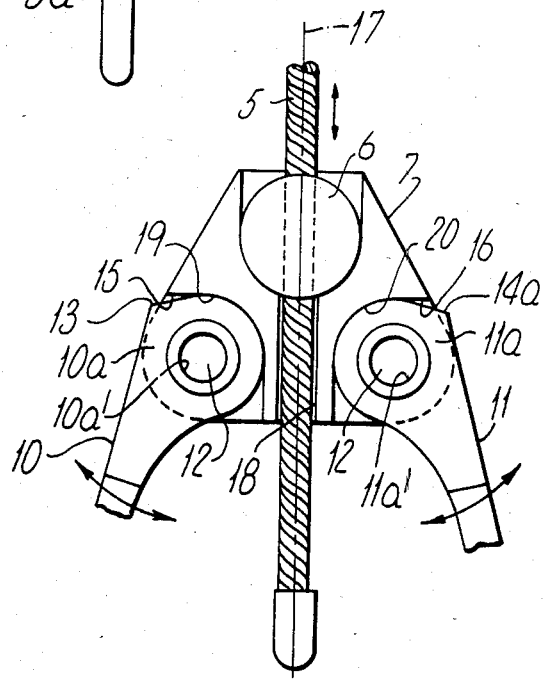
FIG. 3 shows a partial view (section III) of the rim brake according to FIG. 2 to illustrate the position of the cable carrier with the associated pull rod ends when the rim brake is pulled.

In a preferred embodiment the cable carrier 7 has a symmetrical triangular or trapezoid shape when viewed from the front or back; in the diagrammatic illustration in FIGS. 1 to 3 the trapezoid shape is preferred. The cable carrier 7 is made from a flat plate of solid material, preferably metal (aluminium alloy or the like), but a suitably strong plastic could also be used. In the region of its vertical axis of symmetry, which coincides with the vertical axis of symmetry 17 of the rim brake 1, the cable carrier 7 has a groove 18 which is of such a size that the traction cable can be received compactly in it.

In the illustrated embodiment the cable carrier 7 has (cf. FIGS. 2 and 3) recesses 19, 20 which are open towards the rear and are arranged symmetrically on both sides of its vertical axis of symmetry 17. The depth of the said recesses corresponds approximately to the thickness of the pull rod bearing ends 10a and 11a and the recesses have a substantially circular inner peripheral guide surface adapted to the outer periphery of the said bearing ends 10a and 11a respectively so that these bearing ends can be received compactly in the associated recesses 19 and 20 respectively. As FIGS. 2 and 3 show clearly, the straight matching surface 15 or 16 which co-operates with the stop surface 13 or 14 respectively of the associated pull rod bearing ends 10a or 11a respectively is formed on the inner peripheral guide surface of each cable carrier recess 19 or 20 respectively. These matching surfaces 15, 16 in each case form the outwardly-directed free end of the otherwise circular inner peripheral guide surface of each recess 19, 20.

If in this construction according to the invention the traction cable is to be mounted on the cable carrier 7 and is to be adjustable in its effective traction length, then this is done in the normal position, i.e. not pulled, of the rim brake 1. Because of the provision of rigid pull rods 10, 11, the arrangement of stop surfaces 13, 14 on these pull rods and the construction of matching surfaces 15 or 16 respectively on the cable carrier 7 it is not necessary to grip the cable carrier 7 specially when loosening or tightening the nut of the clamping screw 6. On the contrary, one hand remains free to adjust and grip the traction cable 5 in the necessary effective traction length relative to the cable carrier 7, so that the clamping screw 6 is then tightened and the traction cable 5 is clamped at the necessary traction length. The illustrated construction and shape of the cable carrier 7 provides a good appearance and function and also ensures that hardly any mounting parts project from the cable carrier 7. Finally, the rim brake 1 according to the invention has considerably greater stability than known constructions.

The mounting of this rim brake with central traction on the frame of a bicycle is not the subject of the present invention; mounting can be carried out with a conventional mounting bolt and accessories.

I claim:

1. A cycle wheel rim brake construction comprising a one piece mounting member; means for mounting said mounting member between its ends on a cycle frame; a pair of similar two-armed levers corresponding arms of which are adapted to straddle a wheel rim and support brake pads and the other arms of which overlie one another and terminate in free ends located on opposite sides of a plane passing between said corresponding arms; means pivotally mounting both of said levers on said mounting member and at opposite ends of the latter for movements of said corresponding arms toward and away from one another; a unitary cable carrier plate having opposite ends located on opposite sides of said plane; means for adjustably clamping a traction cable to said carrier plate between the ends thereof and coincident with said plane; and a pair of pull rods pivotally connected at corresponding ends to the free ends of said other arms of said levers and at their opposite ends to the opposite ends of said carrier plate, said opposite ends of said pull rods and said opposite ends of said carrier plate having cooperable stops engageable with one another for limiting movement away from one another of said corresponding ends of said levers.

2. A construction according to claim 1 wherein both ends of each of said pull rods are in the form of eyelet bearing surfaces having openings for the passage of pivot pins.

3. A construction according to claim 1 wherein said carrier plate has recesses in which the respective opposite ends of said pull rods are accommodated.

4. A construction according to claim 3 wherein the opposite ends of the respective pull rods and the associated recesses in said carrier plate have corresponding arcuate surfaces terminating in linear surfaces which form said cooperable stops.

5. A construction according to claim 4 wherein said opposite ends of the respective pull rods have a thickness corresponding substantially to the depth of the associated recess.

6. A construction according to claim 1 wherein said carrier plate is symmetrical about a transverse plane passing through said clamping means.

7. A construction according to claim 1 wherein said carrier plate has a groove therein for the accommodation of said traction cable.

8. A construction according to claim 1 wherein said carrier plate has a substantially triangular configuration in elecation.

9. A construction according to claim 1 wherein said carrier plate has a substantially trapezoidal configuration in elevation.

* * * * *